United States Patent
Erlick et al.

(10) Patent No.: US 6,614,769 B1
(45) Date of Patent: Sep. 2, 2003

(54) COMMUNICATIONS UNIT FOR SEAMLESS HANDOVER BETWEEN NETWORKS AND METHOD OF USE THEREFOR

(75) Inventors: John Richard Erlick, Scottsdale, AZ (US); Duke Edward Hanson, Queen Creek, AZ (US); Shawn Hogberg, Chandler, AZ (US); Isaac Eteminan, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/323,324

(22) Filed: Jun. 1, 1999

(51) Int. Cl.[7] ................................................. H04Q 7/20
(52) U.S. Cl. .......................... 370/331; 370/332; 455/439
(58) Field of Search ................................. 370/331–334; 455/436–444

(56) References Cited

U.S. PATENT DOCUMENTS

| | | | | |
|---|---|---|---|---|
| 5,457,680 A | | 10/1995 | Kamm et al. .................. | 370/17 |
| 5,711,004 A | * | 1/1998 | Blasiak et al. ............... | 455/436 |
| 5,854,985 A | | 12/1998 | Sainton et al. ............... | 455/553 |
| 5,857,153 A | | 1/1999 | Lupien ........................ | 455/422 |
| 6,308,066 B1 | * | 10/2001 | Ranta et al. ................ | 370/331 |
| 6,400,946 B1 | * | 6/2002 | Vazvan et al. ............... | 455/432 |

FOREIGN PATENT DOCUMENTS

| | | | | |
|---|---|---|---|---|
| EP | 0749256 | 12/1996 | ............ | H04Q/7/38 |
| WO | 9612377 | 4/1996 | ............ | H04Q/7/32 |
| WO | 9612380 | 4/1996 | ............ | H04Q/7/38 |
| WO | 9628947 | 9/1996 | ............ | H04Q/7/38 |
| WO | 9809454 | 3/1998 | ............ | H04Q/7/22 |

* cited by examiner

*Primary Examiner*—Melvin Marcelo
(74) *Attorney, Agent, or Firm*—Ingrassia Fisher & Lorenz, PC

(57) ABSTRACT

A communications unit determines that a wireless link between itself and a first communications network has degraded beyond acceptable limits (FIG. 2, 200). The communications unit signals a second, unsynchronized, communications network during a pause in outgoing voice (230) in order to acquire a channel and continue the call using the second network. When the second communications network indicates that sufficient resources are available, the communications unit transmits a Handover Trigger to the second network (FIG. 4, 400). In response to the Handover Trigger, the first and second communications network establish a connection between each other (460, 470). When the connection has been established, the communications unit receives a channel assignment (500) and continues the call using the resources of the second communications network.

10 Claims, 3 Drawing Sheets

COMMUNICATIONS UNIT FOR SEAMLESS HANDOVER BETWEEN NETWORKS AND METHOD OF USE THEREFOR

FIELD OF THE INVENTION

The invention relates to the field of wireless communications and, more particularly, to subscriber handover between cellular communications networks.

BACKGROUND OF THE INVENTION

In a cellular communications network, a subscriber call may be handed over among various cellular communications nodes during the course of the call. As the subscriber travels between coverage areas of the individual communications nodes within a communications network, a cellular switching system determines whether a different communications node within the network can better serve the subscriber. When the cellular switching system determines that a different communications node within the network can provide a higher quality channel, the call is handed over in order to maintain the highest quality communications channel. This allows the subscriber to move freely within a particular network as a call is handed over from one communications node to another.

When a low earth orbit satellite cellular communications network is providing services to a subscriber, a call is handed over between adjacent satellite communications nodes in a manner similar to that performed by a terrestrial cellular communications network. In this type of cellular communications network, calls are handed over between adjacent satellite communications nodes due to the satellite's motion relative to an earth-based subscriber.

When a subscriber within a terrestrial cellular communications network moves outside of the coverage area served by the network, the voice and signal quality degrade as the user moves farther away from the outermost terrestrial cellular communications node. As the subscriber moves completely out of the coverage area, the communications network will eventually drop the call. At this point, the subscriber can neither send nor receive information through the communications network.

A partial solution to this problem can be realized through the use of a dual mode communications unit. Through the use of a dual mode communications unit, the subscriber can subsequently contact an appropriate satellite cellular communications node and initiate a new telephone call through the satellite communications network. However, the subscriber is required to redial the previously called party, or wait for an incoming call from the called party to be routed through the satellite communications network to the particular subscriber communications unit. In either case, the subscriber must first successfully register and update their location with the satellite network.

A similar but less problematic situation arises when a subscriber equipped with a dual mode communications unit moves from an area covered by a satellite communications network to an area additionally covered by a terrestrial cellular communications network while engaged in a telephone call. In this case, the subscriber can be making use of relatively expensive satellite resources in order to conduct the telephone call while relatively inexpensive terrestrial resources could be used to conduct the call. In order to take advantage of the less expensive terrestrial communications resources, the subscriber is required to terminate the call through the satellite communications network and re-establish the call through the terrestrial communications network. This represents an undesirable situation where the subscriber's workload is increased in order to take full advantage of inexpensive terrestrial cellular communications.

Therefore, it is highly desirable for the subscriber communication unit to seamlessly roam between a terrestrial and satellite communications network during an active call. Such a system would allow a subscriber leaving an area covered by a terrestrial communications network to seamlessly connect with a global satellite communications network. In a similar manner, such a system would also allow a subscriber telephone call to be handed over from a satellite cellular communications network to a terrestrial communications network when the subscriber travels to a location within the terrestrial communications network's coverage area. This would ensure that the communication unit always makes use of the lowest cost resources available.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures.

DESCRIPTION OF THE PREFERRED EMBODIMENTS

A method and system for seamless handover between communications networks provides the capability for a subscriber to roam outside of a terrestrial coverage area and immediately make contact with a satellite communications network during an active call. This allows a subscriber communications unit to continue a call using the satellite communications network without interruption of the call. In a similar manner, a subscriber engaged in a telephone call using a satellite communications network can seamlessly switch to a terrestrial communications network when the subscriber enters an area covered by the terrestrial network. This allows the subscriber to take advantage of less expensive terrestrial resources as the subscriber moves to an area covered by the terrestrial communications network without interrupting the call. Furthermore, the criteria for switching between the networks can be controlled by the individual subscriber. This allows the communications unit to select the available communications network which provides optimal service to a subscriber based on the predetermined criteria.

Figure 1:
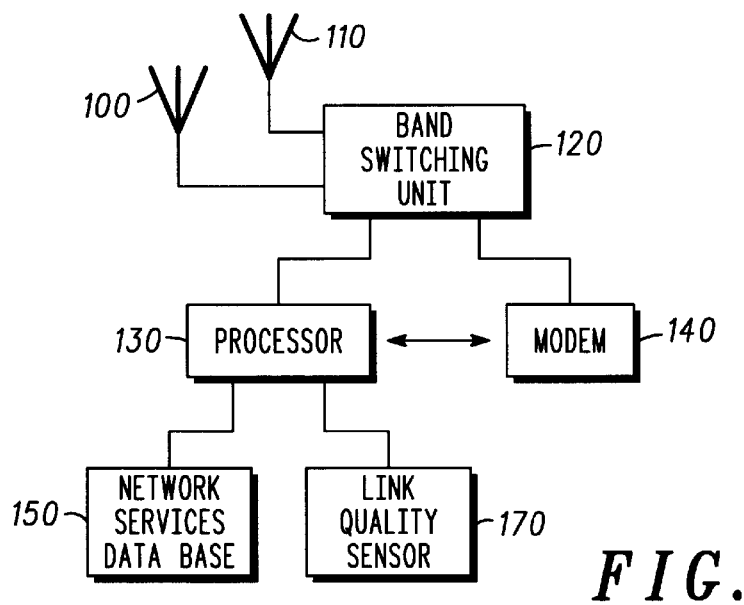
FIG. 1 is a block diagram of a wireless communications unit for seamlessly switching a telephone call from a first to a second communications network in accordance with a preferred embodiment of the invention.

FIG. 1 is a block diagram of a wireless communications unit for seamlessly switching a telephone call from a first to a second communications network in accordance with a preferred embodiment of the invention. In FIG. 1, antennas 100 and 110 are capable of receiving and transmitting signals to and from cellular communications nodes. Desirably, each of antennas 100 and 110 are used for a different frequency band of operation. Thus, for example, antenna 100 may be best suited for communications using the 825 to 849 MHz cellular communications band, while antenna 110 may be best suited for be 1800–1900 MHz communications band. Each of antennas 100 and 110 can be any type of radiating and receiving element, such as a dipole, monopole, patch, loop, or dual polarization antenna. Antennas 100 and 110 can also be representative of phased array antennas which radiate and receive signals using high gain communications beams.

In an alternate embodiment, the functionality of antennas 100 and 110 can be combined into a single antenna. Thus, if the operating frequencies of the first and second communications networks are sufficiently close, antennas 100 and 110 can be replaced by a single antenna suitable for use with both communications networks. Other techniques such as broadband antenna design can also provide the capability for a single antenna to be used in place of antennas 100 and 110.

Antennas 100 and 110 are each coupled to band switching unit 120. Band switching unit 120 preferably incorporates high isolation switches which reduce interference between the signals radiated and received through antennas 100 and 110. Thus, in a preferred embodiment, band switching unit 120 provides at least 80 dB of isolation between the inputs from antennas 100 and 110.

Band switching unit 120 is coupled to processor 130 and modem 140. Processor 130 controls the operations of the apparatus of FIG. 1 including determining the resources used to establish a communications link with the second communications network. Processor 130 also controls the operations of link quality sensor 170 according to a predetermined set of criteria. In a preferred embodiment, processor 130 is also coupled to network services database 150. In a preferred embodiment, network services database 150 includes information regarding the characteristics of each network available to the communications unit of FIG. 1. This information can include, for example, the cost per minute for the various available communications networks, channel bandwidths within each network, channel tuning information, and other network characteristics. Desirably, network services database 150 also includes a predetermined criteria such as the subscriber's minimum bandwidth requirement, or the maximum cost subscriber will pay per billing increment. This information can assist processor 130 in determining whether to switch the call from the first to the second communications networks as well as providing the necessary tuning information for the available networks.

Processor 130 also performs any required signaling and protocol functions which may be required in order to communicate with the appropriate communications networks, such as GSM, IS-41, and so forth. Further, processor 130 may additionally perform a timing function in order to allow band switching unit 120 to periodically switch from a first to a second network to ensure that the subscriber is always connected to the communications network which provides the lowest cost service, highest bandwidth, or possesses other desirable features.

As previously mentioned, band switching unit 120 is also coupled to modem 140. Modem 140 converts any signaling from processor 130 to the appropriate modulation format. Modem 140 also modulates and demodulates any outgoing and incoming voice signals according to an appropriate modulation format. Modem 140 can be a time domain multiple access, frequency domain multiple access, or code division multiple access modulator/demodulator, or may employ a combination of two or more of the aforementioned formats.

Also mentioned previously, processor 130 is also coupled to link quality sensor 170. In a preferred embodiment, link quality sensor 170 functions to evaluate the quality of the communications link between the wireless communications unit and a communications node of the communications network. Link quality sensor 170 may evaluate the link quality through measurement of a signal to noise ratio, for use with an analog communications system, or may evaluate bit error rate and number of lost data frames in a digital communications system.

Figure 2:
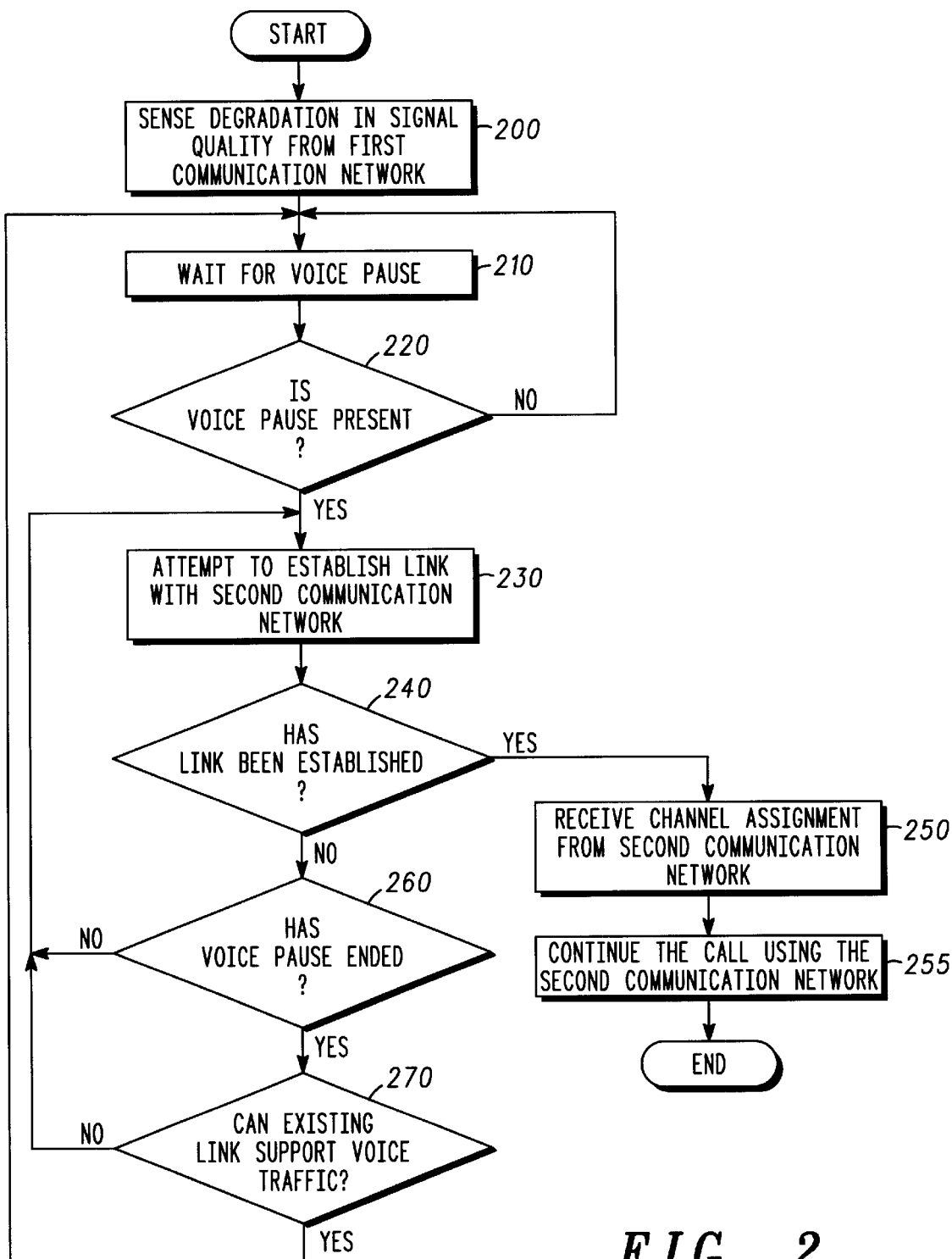
FIG. 2 is a flow chart of a method executed by a wireless communications unit for seamlessly switching a telephone call from a first to a second communications network in accordance with a preferred embodiment of the invention.

FIG. 2 is a flow chart of a method executed by a wireless communications unit for seamlessly switching a telephone call from a first to a second communications network in accordance with a preferred embodiment of the invention. The method of FIG. 2 begins with step 200 where the wireless communications unit senses a degradation in signal quality from a communications node of a first communications network. Step 200 may be the result of a measurement of bit error rate, an excessive number of lost voice or data frames, or the measurement of a signal to noise ratio. In step 210, the communications unit waits for a pause in the outgoing voice from the communications unit. In step 220, the communications unit determines that a voice pause is present. During the voice pause, the communications unit attempts to establish a link with a communications node from a second communications network. During step 230, the operating frequency of the communications unit may be switched in order to transmit and receive signaling messages to and from communications nodes of the second communications network.

In an alternate embodiment, steps 210–230 can be executed without the explicit need for a voice pause to be present. In accordance with this alternate embodiment, any unused communications channel resource can be exploited in order to provide a means by which signaling with a second communications network can be accomplished. For example, in a time domain multiple access system, the communications unit may exploit an unused time slot or a guard band in order to transmit and receive signaling messages to a second communications network. In another example, in a frequency domain multiple access system, an unused frequency channel can be used in order to transmit and receive signaling messages.

At step 240, the communications unit evaluates whether a link with a second communications network has been established. If the link has been established, step 250 is executed in which the communications unit receives a channel assignment from the second communications network. Step 255 is then executed in which the wireless communications unit acquires a channel from the second communications network, and continues the call using the second communications network.

If the decision of step 240 indicates that a link has not been established, step 260 is executed in which the communications unit determines whether the voice pause has ended. If the voice pause has not ended, the method returns to step 230 where the communications unit continues to attempt to establish a link with a second communications network. In the decision of step 260 indicates that the voice pause has ended, step 270 is executed. In step 270 the communications unit determines whether the existing link with the first communications network can continue to support voice traffic. This step is particularly useful when the signal from the first communications network is rapidly degrading and further communications with the first communications network is unlikely due to poor signal quality.

If the decision of step 270 indicates that the first communications unit can no longer support voice traffic, indicating substantial degradation in signal quality, the method returns to step 230. Under these conditions, the subscriber will not be able to transmit voice to the first communications network. Thus, the method calls for the "stealing" of transmit frames in order to establish communications with the second communications network. Although this frame stealing aspect of the method is generally undesirable, it is preferred over the current practice of terminating the call in response to a poor communications link. Thus, although frame stealing is generally viewed as a last resort, it nonetheless represents a significant improvement over current methods of managing a call when poor signal quality exists.

If the decision of step 270 indicates that the existing link with the first communications network can continue to support voice traffic, the method returns to step 210 and waits for another voice pause. The method is then repeated, beginning with step 210, until a link with a second communications network can be established.

Figure 3:
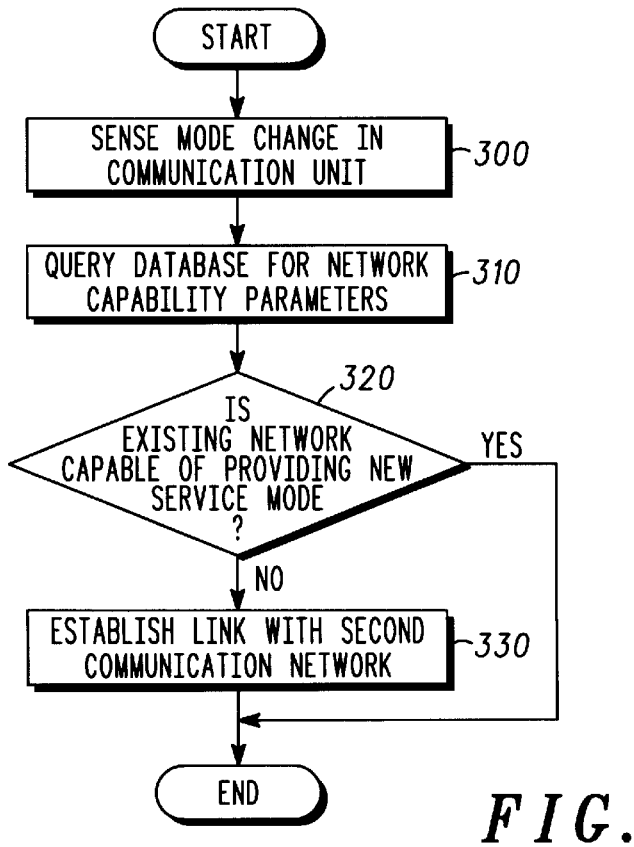
FIG. 3 is a flow chart of another method executed by a wireless communications unit for seamlessly switching a telephone call from a first to a second communications network in accordance with a preferred embodiment of the invention.

FIG. 3 is a flow chart of another method executed by a wireless communications unit for seamlessly switching a telephone call from a first to a second communications network in accordance with a preferred embodiment of the invention. The apparatus of FIG. 1 is suitable for performing the method of FIG. 3. In FIG. 3, a change in an operating mode of the communications unit is sensed in step 300. Preferably, the change in the operating mode is the result of the communications unit being switched from a voice channel to a higher bandwidth data channel, or enters another operational mode which requires the initiation or modification of a communications service which is introduced while the call is in progress.

In step 310, the communications unit queries a network services database, such as network services database 150 of FIG. 1, in order to determine whether a second communications network can provide better service. Step 310 may include an update of available network services which ensures that any switch from a first to a second network is based on current network channel information. At step 320, the communications unit determines whether a second network can provide a higher quality of service based on the subscriber's need and the updated network services database.

If the decision of step 320 indicates that a connection with a second network will not result in a higher quality of service, the method terminates. If, however, the decision of step 320 indicates that a second network can better serve the subscriber, the method continues at step 330. In step 330, the communications unit establishes a connection with the second communications network. In step 330, the communications unit exploits a voice pause or other unused communications resource in order to conduct any signaling needed to effect the handover from the first communications network to the second. Additionally, step 330 may require more than one attempt to signal the second communications network and bring about the handover.

Figure 4:
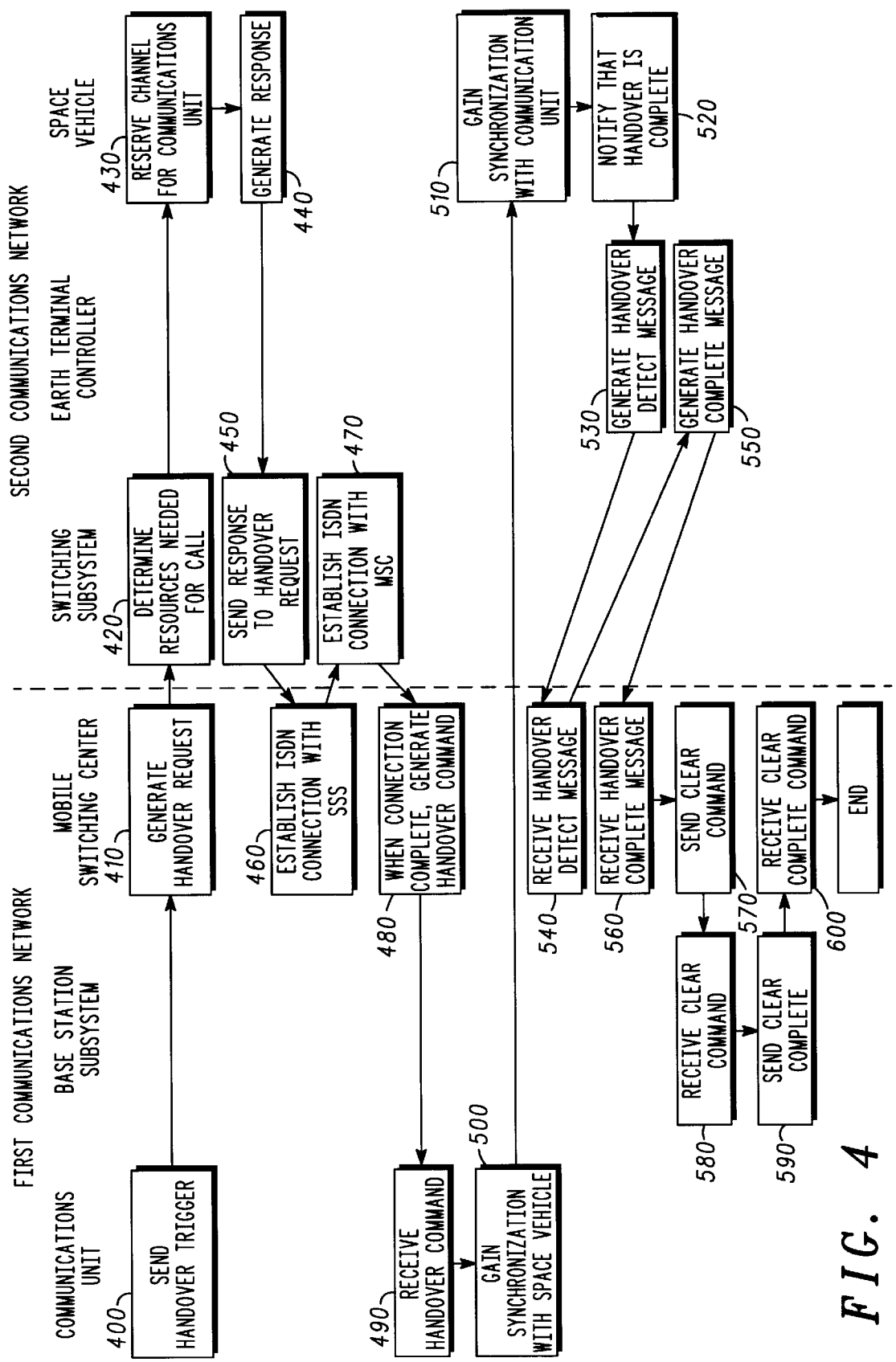
FIG. 4 is a flow chart of a method used by a first and second communications network to perform seamless roaming during an active call in accordance with a preferred embodiment of the invention.

FIG. 4 is a flow chart of a method used by a first and second communications network to perform seamless roaming during an active call in accordance with a preferred embodiment of the invention. In the example of FIG. 4, the first communications network is representative of a GSM network, while the second network corresponds to a satellite communications network. Although FIG. 4 illustrates a method using a GSM and a satellite communications network, this is intended to be exemplary only, as the method may be practiced using a variety of standard networks, such as GSM, or IS-41. When the method is practiced using a GSM network as the "second" communications network, the space vehicle of FIG. 2 can be replaced by the by a base station transceiver. Further, the earth terminal controller of FIG. 2 can be replaced with a base station controller.

The method of FIG. 4 begins at step 400, where a communications unit sends a Handover Trigger to a mobile switching center of a first communications network. The Handover trigger of step 400 may be the result of the communications unit sensing a degradation in channel quality from the first communications network and signaling the second communications in order to determine that a channel on the second communications network is available. As an example, in a handover to the IRIDIUM® system, the communication unit acquires the space vehicle identifier, space vehicle beam identification number, and a space vehicle trailing beam identification. This information preferably included in the Handover Trigger. The information is used by the IRIDIUM® communications network to identify the physical and logical addresses of the target space vehicle which the communication unit has selected for use. In alternate embodiments, the Handover Trigger preferably includes equivalent information which the second communications network uses to identify the physical and logical addresses of the communications resource which can accept the handed over call.

In another alternate embodiment, the Handover Trigger of step 400 can be the result of the communications unit determining that the second communications network can better serve the subscriber unit based in the subscriber's immediate need for increased bandwidth or other service feature.

In a preferred embodiment, the Handover Trigger is conveyed through a base station subsystem of the first communications network to a mobile switching center. In step 410, the mobile switching center generates a Handover Request message and conveys this to the switching subsystem of the second communications network. At step 420, the switching subsystem of the second communications network determines the resources needed to support the call. These resources may include, for example, a frequency channel in a frequency domain multiple access communication system, a time slice in a time domain multiple access communication system, or code processing resources in a code division multiple access communications system. Additionally, in step 420 the resources required to support the call are conveyed through the earth terminal controller to a space vehicle within the second communications network. In step 430, the space vehicle reserves the resources required to accept the handed over call.

At step 440, the space vehicle generates a response which indicates that the necessary call resources have been reserved. This response is transmitted through the earth terminal controller to the switching subsystem. At step 450, the switching subsystem receives a response and conveys this response to the mobile switching center which previously initiated the Handover Request in step 410.

In steps 460 and 470, the mobile switching center of the first communications network and the switching subsystem of the second communications network establish an ISDN, TCP/IP or other high speed connection with each other. The method and resources required to establish the connections in steps 460 and 470 are well-known to those skilled in the art. When the connection has been established, the mobile switching center generates a Handover command and transmits the Handover command to the communications unit in step 480. In step 490, the communications unit receives the Handover command.

In response to the Handover command received in step 490, the communications unit gains synchronization with the space vehicle in order to ensure a seamless handover of the call, in step 500. Step 500 also includes the communications unit receiving a channel assignment from the space vehicle. In step 510, the space vehicle gains synchronization with the communications unit and begins to transmit and receive voice or data traffic from the communications unit. In step 520, the space vehicle generates a message indicating that the space vehicle has successfully acquired the call from the communications unit by generating and transmitting a Handover Complete message. At step 530, the earth terminal controller of the second communication network receives the Handover Complete message and generates a message indicating detection of the handover. Also in step 530, the Handover Detect message is transmitted to the mobile switching center of the first communications network.

In step 540, the Handover Detect message is received by the mobile switching center of the first communications network. Step 540 denotes the start of the call teardown process where the first communications network deallocates the resources used to enable the call. In step 550 the earth terminal controller conveys a message to the earth terminal controller indicating the handover is complete. At step 560, the mobile switching center receives a Handover Complete message and generates a Clear command in step 570. Also in step 570, the mobile switching center sends the Clear command to the base station subsystem of the first communications network which receives this message in step 580. In step 590, a Clear Complete command is sent from the base station subsystem of the first communications network to the mobile switching station. In step 600 the mobile switching center receives the Clear command and completes the teardown of the call within the first communications network. The method ends thereafter.

A method and system for seamless roaming during an active call between communications networks provides the capability for a subscriber to roam outside of a terrestrial coverage and handover a call to a second communications network. This allows a subscriber communications unit to continue a call using the second communications network without interruption of the call. In a similar manner, a subscriber engaged in a telephone call using a satellite communications network can seamlessly switch to a terrestrial communications network when the subscriber enters an area covered by the terrestrial network. This allows the subscriber to take advantage of less expensive terrestrial resources as the subscriber moves to an area covered by the terrestrial communications network without interrupting the call. Furthermore, the criteria for switching between the networks can be controlled by the individual subscriber allowing the communications unit to select the available communications network which provides optimal service to a subscriber based on the predetermined criteria.

Accordingly, it is intended by the appended claims to cover all modifications of the invention that fall within the true spirit and scope of the invention.

What is claimed is:

1. In a communications unit, a method of switching a call from a first communications network to a second communications network, comprising the steps of:
    sensing a degradation in signal quality between said communications unit and said first communications network;
    establishing a communications link with said second communications network by transmitting a signaling message to the second communications network during a pause in outgoing voice traffic to obtain a channel assignment from the second communications network;
    using transmit frames to transmit said signaling message to said second communications network if the channel assignment has not been received before the end of said pause in outgoing voice traffic; and
    switching said call from said first communications network to said second communications network in response to said channel assignment.

2. The method of claim 1, wherein said sensing step additionally comprises the step of measuring a bit error rate in a signal received from said first communications network.

3. The method of claim 1, wherein said sensing step additionally comprises the step of measuring a signal to noise ratio in a signal received from said first communications network.

4. The method of claim 1, wherein said establishing step additionally comprises the step of changing from a first operating frequency to a second operating frequency in order to receive a signal from said second communications network.

5. The method of claim 4, wherein said establishing step further comprises the step of returning to said first operating frequency if the channel assignment from said second communications network has not been received within a predetermined time period.

6. In a communications unit, a method for switching a call from a first communications network to a second communications network, comprising the steps of:
    communicating with said first communications network;
    determining that said second communications network delivers optimal service based on a predetermined criteria;
    establishing a link with said second communications network during a pause in outgoing voice traffic;
    using transmit frames to transmit a signaling message to said second communications network if a channel assignment has not been received before the end of said pause in outgoing voice traffic; and
    switching said call to said second communications network based on said establishing step.

7. The method of claim 6, wherein said predetermined criteria comprises a requirement for minimum bandwidth.

8. The method of claim 6, wherein said predetermined criteria comprises maximum subscriber cost per billing increment.

9. A communications unit for switching a call from a first communications network to a second communications network, said communications unit comprising:
    a link quality sensor for sensing a degradation in signal quality between said communications unit and said first communications network;
    a band switching unit coupled to said link quality sensor for switching said call from said first communications network to said second communications network during a pause in outgoing voice traffic; and a processor coupled to said band switching unit configured to determine whether said call should be switched to said second communications network, wherein said processor is operable to use transmit frames to transmit a signaling message to said second communications network if a channel assignment has not been received before the end of said pause in outgoing voice traffic.

10. The wireless communications unit of claim 9, wherein the switching unit comprises high isolation switches which reduce interference between said first and said second communications networks.

* * * * *